United States Patent [19]
Curtis et al.

[11] 3,837,701
[45] Sept. 24, 1974

[54] CAMPER MOUNTING APPARATUS

[75] Inventors: George B. Curtis; Betty L. Curtis, both of Hooper, Colo.

[73] Assignee: The Raymond Lee Organization, Inc., New York, N.Y. ; a part interest

[22] Filed: Oct. 15, 1973

[21] Appl. No.: 406,496

[52] U.S. Cl........ 296/23 MC, 248/361 R, 296/35 A
[51] Int. Cl.............................................. B60p 3/32
[58] Field of Search ............ 296/35 A, 23 MC, 100; 280/179 A; 248/361 R, 361 A; 105/368 T, 369 R, 369 A, 369 B

[56] References Cited
UNITED STATES PATENTS

| | | | |
|---|---|---|---|
| 1,770,798 | 7/1930 | Nicholson | 105/368 T |
| 2,919,946 | 1/1960 | Miener | 296/100 X |
| 3,430,981 | 3/1969 | Tarantola | 280/179 A |
| 3,792,900 | 2/1974 | Bugh | 296/23 MC |

*Primary Examiner*—Lloyd L. King
*Assistant Examiner*—Randolph A. Reese
*Attorney, Agent, or Firm*—Daniel Jay Tick

[57] ABSTRACT

Camper mounting apparatus comprises a member having one end affixed to the chassis of a pickup truck and a free end extending transversely beyond the bed of the truck. An adjustable tension spring has one end affixed to a first point on a camper seated in the bed of the truck. A cable has one end affixed to a second point on the camper spaced from the first point and another end affixed to the other end of the spring. A turnbuckle has one end affixed to the common ends of the spring and the cable. A chain has one end affixed to the other end of the turnbuckle and another end affixed to the free end of the member.

2 Claims, 4 Drawing Figures

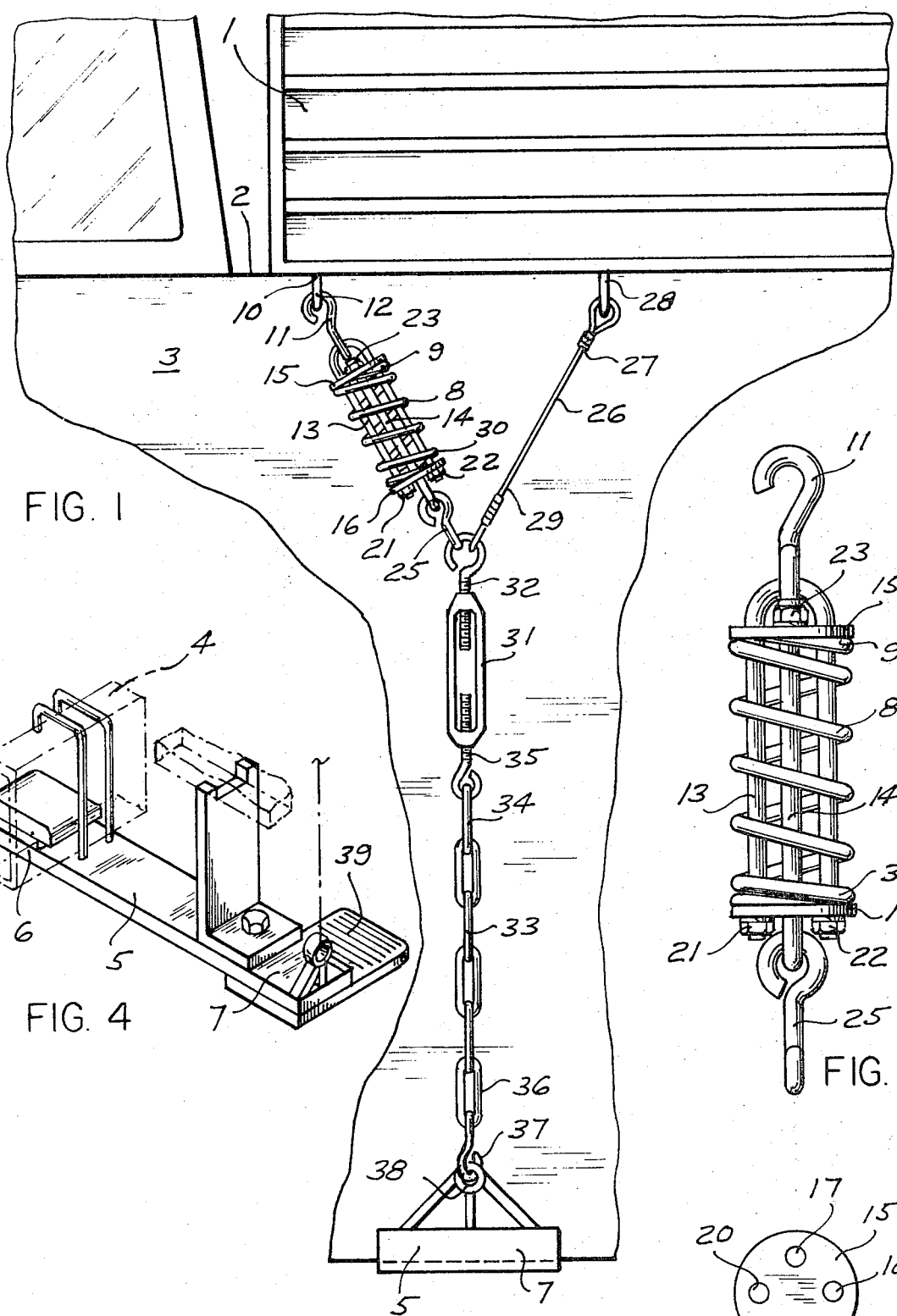

3,837,701

CAMPER MOUNTING APPARATUS

DESCRIPTION OF THE INVENTION

The present invention relates to camper mounting apparatus. More particularly, the invention relates to camper mounting apparatus for adjustably affixing a camper seated in the bed of a pickup truck to the chassis of the truck.

Objects of the invention are to provide camper mounting apparatus of simple structure, which is inexpensive in manufacture, is installable with facility, convenience and simplicity, and adjustably affixes the camper to the chassis of a pickup truck with efficiency, effectiveness and reliability.

In order that the invention may be readily carried into effect, it will now be described with reference to the accompanying drawing, wherein:

FIG. 1 is a view of an embodiment of the camper mounting apparatus of the invention in use;

FIG. 2 is a view of an embodiment of the adjustable tension spring of the appratus of FIG. 1;

FIG. 3 is a plan view of a washer of the adjustable tension spring of FIG. 2; and FIG. 4 is a schematic diagram of an embodiment of the member of the apparatus of FIG. 1.

The camper mounting apparatus of the invention is for adjustably affixing a camper 1 (FIG. 1) seated in the bed 2 of a pickup truck 3 (FIG. 1) to the chassis 4 (FIG. 4) of the truck.

The camper mounting apparatus of the invention comprises a member 5 (FIGS. 1 and 4) having one end 6 affixed to the chassis 4 of the truck 3 and a free end 7 extending transversely beyond the bed of the truck.

An adjustable tension spring 8 (FIGS. 1 and 2) has one end 9 affixed to a first point 10 on the camper 1 via a hook 11 and an eye 12. The adjustable tension spring comprises a compression spring 8. A pair of U-bolts 13 and 14 pass through the spring 8 in opposite directions at substantially right angles to each other. Each of a pair of washers 15 and 16 (FIGS. 1, 2 and 3) is provided at a corresponding end of the spring 8. Each of the washers 15 and 16 has four holes 17, 18, 19 and 20 (FIG. 3) formed therethrough with both U-bolts 13 and 14 passing therethrough. Nuts 21, 22, 23 (FIGS. 1 and 2) and 24 (not shown in the FIGS.) hold the washers 15 and 16 in position. The hook 11 is mounted on the U-bolt 13 and a hook 25 is mounted on the U-bolt 14.

The camper mounting apparatus of the invention further comprises a cable 26 (FIG. 1) having one end 27 affixed to a second point 28 on the camper 1 spaced from the first point 10 and another end 29 affixed to the other end 30 of the spring 8. This is accomplished by ring couplings.

A turnbuckle 31 (FIG. 1) has one end 32 affixed to the common ends of the spring 8 and the cable 26.

A chain 33 (FIG. 1) has one end 34 affixed to the other end 35 of the turnbuckle 31 and another end 36 affixed by hook 37 and eye 38 to the free end 7 of the member 5.

As shown in FIG. 4, a step 39 is provided at the free end 7 of the member 5 to facilitate climbing up to the camper.

While the invention has been described by means of a specific example and in a specific embodiment, we do not wish to be limited thereto, for obvious modifications will occur to those skilled in the art without departing from the spirit and scope of the invention.

We claim:

1. Camper mounting apparatus for adjustably affixing a camper seated in the bed of a pickup truck to the chassis of the truck, said apparatus comprising a member having one end affixed to the chassis of the truck and a free end extending transversely beyond the bed of the truck;

an adjustable tension spring having one end affixed to a first point on the camper;

a cable having one end affixed to a second point on the camper spaced from the first point and another end affixed to the other end of the spring;

a turnbuckle having one end affixed to the common ends of the spring and the cable; and a chain having one end affixed to the other end of the turnbuckle and another end affixed to the free end of the member.

2. Camper mounting apparatus as claimed in claim 1, wherein the adjustable tension spring comprises a compression spring, a pair of U-bolts passing through the spring in opposite directions at substantially right angles to each other, a pair of washers each at a corresponding end of the spring and each has four holes formed therethrough with both U-bolts passing therethrough, nuts on the U-bolts holding the washers in position and a pair of hooks, each on a corresponding one of the U-bolts.

* * * * *